United States Patent
Hosoda (10) Patent No.: US 9,286,117 B2
(45) Date of Patent: Mar. 15, 2016

(54) IMAGE FORMING DEVICE INCLUDING THE DELAY OF STARTUP OF NON-PRIORITY TASKS FOR A PREDETERMINED TIME AFTER THE STARTUP OF PRIORITY TASKS ARE COMPLETED

(75) Inventor: Yuichi Hosoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 13/212,005

(22) Filed: Aug. 17, 2011

(65) Prior Publication Data

US 2012/0047510 A1    Feb. 23, 2012

(30) Foreign Application Priority Data

Aug. 23, 2010   (JP) ................................. 2010-186071

(51) Int. Cl.
*G06F 9/46*   (2006.01)
*G06F 9/48*   (2006.01)

(52) U.S. Cl.
CPC .................................... *G06F 9/4881* (2013.01)

(58) Field of Classification Search
CPC ..................... G06F 9/4418; G03G 2221/1838; H04N 1/00915; H04N 1/00928; H04N 1/00923; B41P 2233/10
See application file for complete search history.

(56) References Cited

U.S. PATENT DOCUMENTS 7,500,091 B2 *   3/2009   Ergan et al. ........................ 713/1
8,520,249 B2 *   8/2013   Muto et al. .................... 358/1.16

FOREIGN PATENT DOCUMENTS

JP   7-084848 A   3/1995
JP   2009-166369 A   7/2009

* cited by examiner

*Primary Examiner* — Wissam Rashid
(74) *Attorney, Agent, or Firm* — Canon USA, Inc. I.P. Division (57) ABSTRACT

An image forming device includes a priority task startup detection unit to detect that startup of a priority task is completed, a job acceptance unit configured to change a status to a job acceptable status and accept a job when it is detected that the startup of the priority task is completed, a first startup control unit to start the non-priority task when a predetermined time has elapsed since it is detected that the startup of the priority task is completed, and a second startup control unit to start the non-priority task a job is accepted from the time it is detected that the startup of the priority task is completed to when the predetermined time has elapsed and if all processing of all jobs, including the accepted job is terminated.

9 Claims, 8 Drawing Sheets

| TASK ID | STARTUP PRIORITY | STARTUP TRIGGER |
|---------|------------------|-----------------|
| TID01   | 1                | PRINT           |
| TID02   | 1                | PRINT           |
| TID03   | 1                | PDL1            |
| TID04   | 1                | PDL2            |
| TID05   | 2                | PDL3            |
| TID06   | 1                | BUTTON1         |
| TID07   | 1                | USB-H           |
| ⋮       | ⋮                | ⋮               |

FIG.8

| PDL TYPE | COUNTER |
|----------|---------|
| PDL1 | 50 |
| PDL2 | 0 |
| PDL3 | 30 |
| PDL4 | 0 |
| PDL5 | 0 |

IMAGE FORMING DEVICE INCLUDING THE DELAY OF STARTUP OF NON-PRIORITY TASKS FOR A PREDETERMINED TIME AFTER THE STARTUP OF PRIORITY TASKS ARE COMPLETED

BACKGROUND OF THE INVENTION

1. Field of the Invention

The present invention relates to an image forming device that performs an operation through the processing of multiple tasks.

2. Description of the Related Art

The system of an image forming device has been increasing year after year. As the system has increased, so has the amount of initialization processing required when powering on the image forming device. This increase has resulted in a longer startup time from power-on to the start of image forming processing. To address this problem, Japanese Patent Application Laid-Open No. 07-084848 discusses a hibernation technology. The hibernation technology stores memory information before shutdown in a nonvolatile storage device, such as a hard disk drive (HDD), and at power-on time, restores the information from the nonvolatile storage device where the information was stored back to the memory.

The hibernation technology eliminates the need for the initialization processing at power-on time and reduces the startup time. However, for an image forming device with a configuration in which a large-capacity nonvolatile storage device such as an HDD is not provided, the startup time cannot be reduced by the hibernation technology. Japanese Patent Application Laid-Open No. 2009-166369 discusses another technology for minimizing the initialization processing at power-on time in which no emulation program is started when the power is turned on, but an emulation program corresponding to print data is started when the print data is received.

However, a drawback with this technology is a time from the reception of print data to the completion of image forming processing (hereinafter, this time is referred to as a first print out time (FPOT)). Specifically, the FPOT of a print data, which is a first type received after the power is turned on, is always longer than the FPOT of other print data. In addition, another technology is provided for use on an image forming device that uses multiple tasks for controlling the image formation. Specifically, after the power is turned on, the image forming device starts only the minimum number of tasks (hereinafter referred to as priority tasks) required for a print job to print data and, after the startup of the priority tasks is completed, puts the device in the job acceptable status and, at the same time, starts the remaining tasks (hereinafter referred to as non-priority tasks).

The drawback of this technology is that, when a job is accepted during the initialization processing of a non-priority task, the central processing unit (CPU) of the image forming device is not allocated sufficiently to the processing of the accepted job because the CPU is used for the initialization processing of the non-priority startup task.

Therefore, this technology does not achieve good performance in terms of job processing speed.

SUMMARY OF THE INVENTION

The present invention is directed to an image forming device that reduces the length of time before the device becomes ready for accepting print data after the power is turned on and, at the same time, implements the optimum task startup control for maintaining the FPOT performance of print data received after the device becomes ready for accepting print data.

According to an aspect of the present invention, an image forming device includes a priority task startup detection unit to detect that startup of a priority task is completed, a job acceptance unit configured to change a status to a job acceptable status and accept a job when it is detected that the startup of the priority task is completed, a first startup control unit to start the non-priority task when a predetermined time has elapsed since it is detected that the startup of the priority task is completed, and a second startup control unit to start the non-priority task a job is accepted from the time it is detected that the startup of the priority task is completed to when the predetermined time has elapsed and if all processing of all jobs, including the accepted job is terminated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
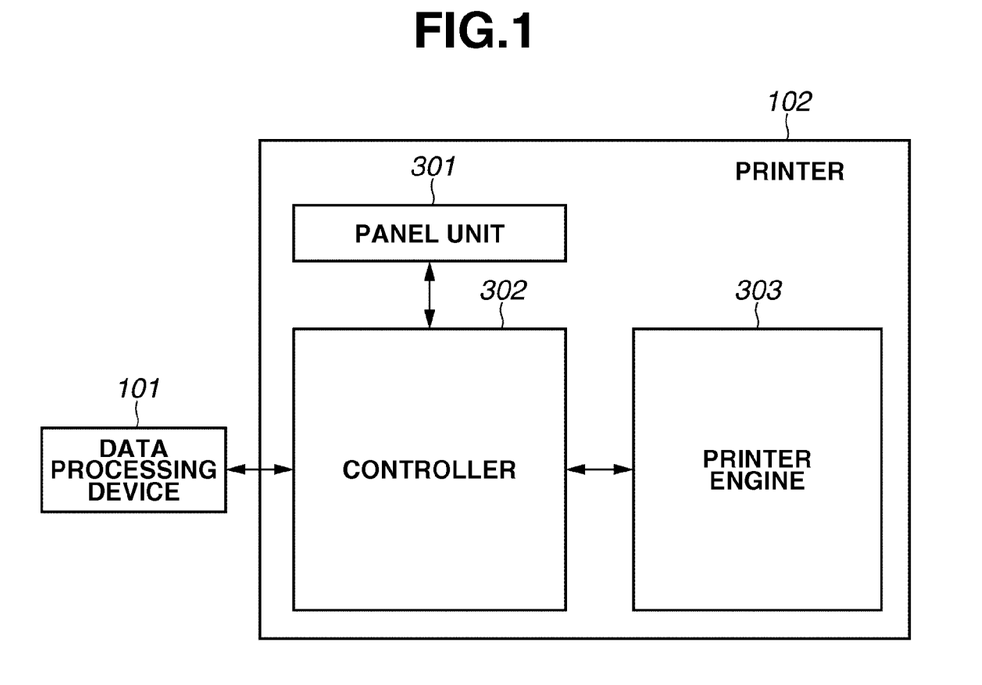
FIG. 1 is a diagram illustrating the overview of the system configuration of an image forming device of the present invention.

The following describes the system configuration of a printer. FIG. 1 is a diagram illustrating the overview of the system configuration of an image forming device in a first exemplary embodiment of the present invention.

Referring to FIG. 1, a data processing device 101 is a computer that functions as the source of image information. In the present exemplary embodiment, a laser beam printer (hereinafter referred to as a printer) is used as an image forming device 102. It is to be understood that the image forming device is not limited to a laser printer, and any other type of printer, e.g., inkjet printer, is applicable.

A printer controller (controller) 302 generates raster data for each page of a print job based on image information (for example, page description language (PDL)) supplied from the data processing device 101 and sends the generated raster data to a printer engine 303.

The printer engine 303 forms a latent image on a photosensitive drum based on the raster data supplied from the controller 302 and transfers and fixes the latent image, using an electrophotographic method for example, on a recording medium to record an image.

A panel unit 301 is used as the user interface. The controller 302 accepts a user-desired operation instruction via the panel unit 301. The controller 302 also displays the processing contents of the printer 102 and the contents of a warning to the user via the panel unit 301.

Figure 2:
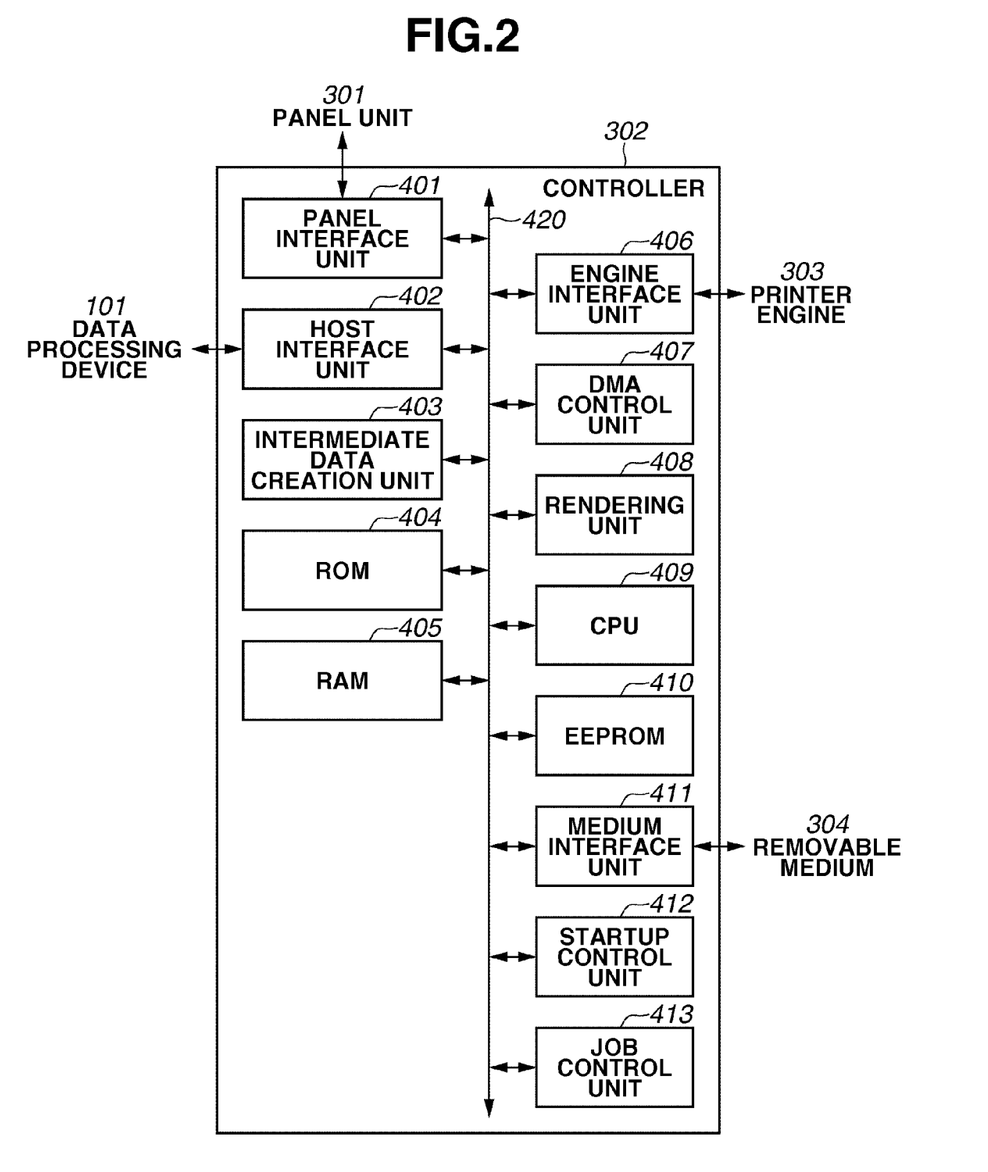
FIG. 2 is a block diagram illustrating an example of the configuration of a controller of the present invention.

FIG. 2 is a block diagram illustrating an example of the configuration of the controller 302. A panel interface unit 401 carries out data communication with the panel unit 301. Via the panel interface unit 401, a CPU 409 accepts settings and instructions received from the user via the panel unit 301. A host interface unit 402 serves as the interface to carry out bidirectional communication with the data processing device 101. An intermediate data creation unit 403 converts a print job, received from the data processing device 101 via the host interface unit 402, to intermediate data that is an easy-to-process form in the printer 102.

A read-only memory (ROM) 404 stores the processing described in the present invention and other control program code performed by the printer 102. A random access memory (RAM) 405 is a memory. The CPU 409 stores the following data in the RAM 405: print data received via the host interface unit 402, intermediate data generated by interpreting print data, bit map generated by rendering intermediate data, and various temporary processing statuses required for other processing.

An engine interface unit 406 performs communication connection with the printer engine 303. The CPU 409 recognizes the status of the printer engine 303 via the engine interface unit 406. The controller includes a dynamic memory access (DMA) control unit 407. The CPU 409 transfers the bit map data, stored in the RAM 405, to the engine interface unit 406 via the DMA control unit 407. A rendering unit 408 expands intermediate data into a bit map image according to the contents of the intermediate data stored in the RAM 405. An electronically erasable and programmable read only memory (EEPROM) 410, one of the non-volatile memories, stores the setting information on the printer 102. A medium interface unit 411 reads or writes various types of data, such as image data, program data, and device setting data, to and from a removable medium 304 such as a USB memory.

A startup control unit 412 checks, at power-on time, the status of the interface units according to a predetermined procedure and performs initialization required for the intermediate data creation unit 403, rendering unit 408, engine interface unit 406, and DMA control unit 407. The startup control unit 412 instructs the startup of each task at power-on time to initialize the task because the control program code stored in the ROM 404 is configured to perform control by multiple tasks.

A job control unit 413 sequentially issues an instruction to the intermediate data creation unit 403, rendering unit 408, engine interface unit 406, and DMA control unit 407, to process multiple print jobs received from the data processing device 101 via the host interface unit 402.

The CPU 409 controls the above-described components of the controller 302 via a CPU bus 420, based on control program code stored in the ROM 404. The CPU bus 420 includes the address bus, data bus, and control bus. Each of the components connected to the CPU bus 420 can access any other component connected to the CPU bus 420.

Figure 3:
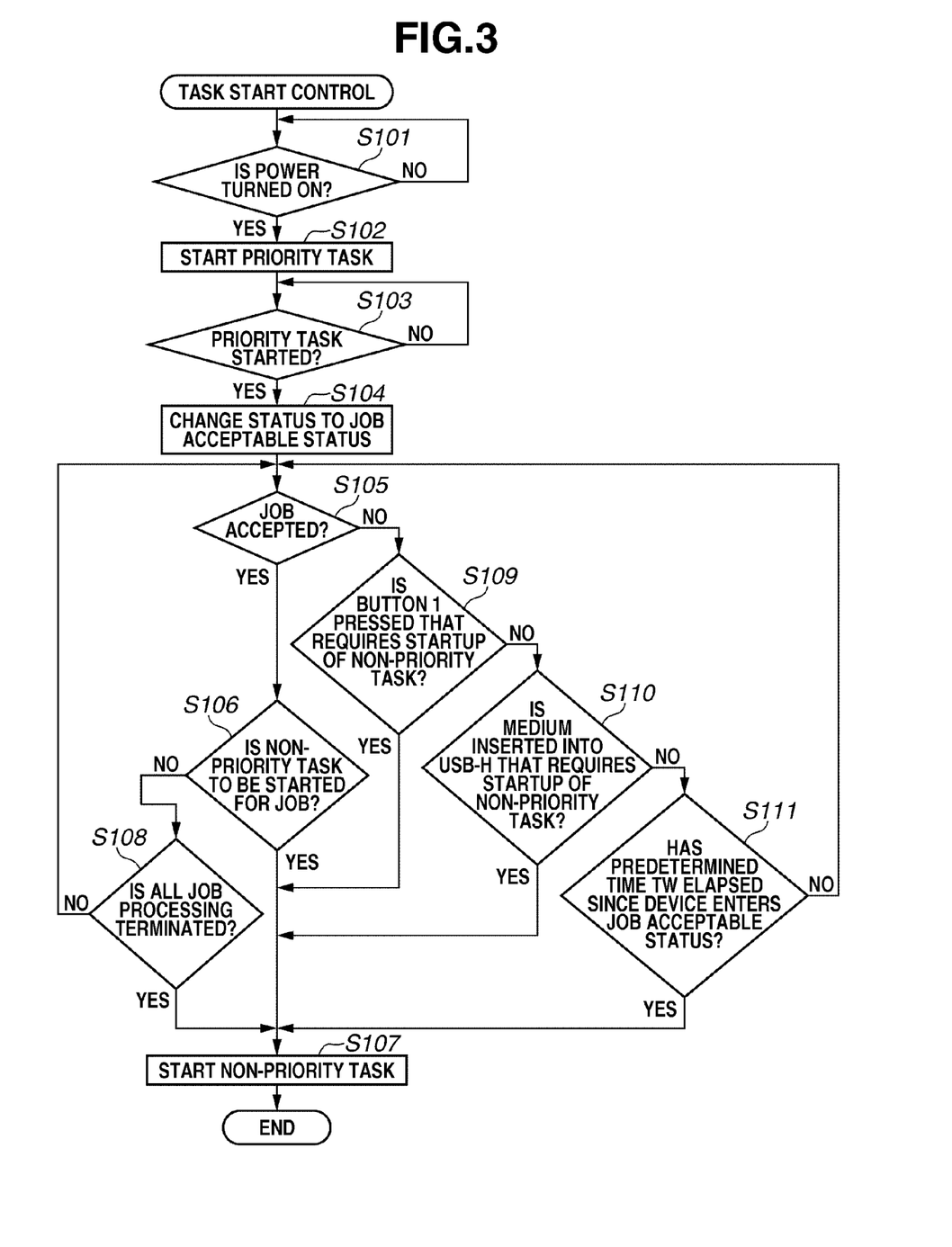
FIG. 3 is a flowchart illustrating the procedure for task startup control of the present invention.

FIG. 3 is a flowchart illustrating the procedure for the task start control performed by the startup control unit 412 at power-on time. In step S101, a determination is made whether power has been turned on. If is determined that power has been turned on, then flow proceeds to step S102, where the startup control unit 412 first starts up priority tasks. In step S103, a check is made whether the priority tasks have been started. If they have, flow proceeds to step S104.

Figure 7:
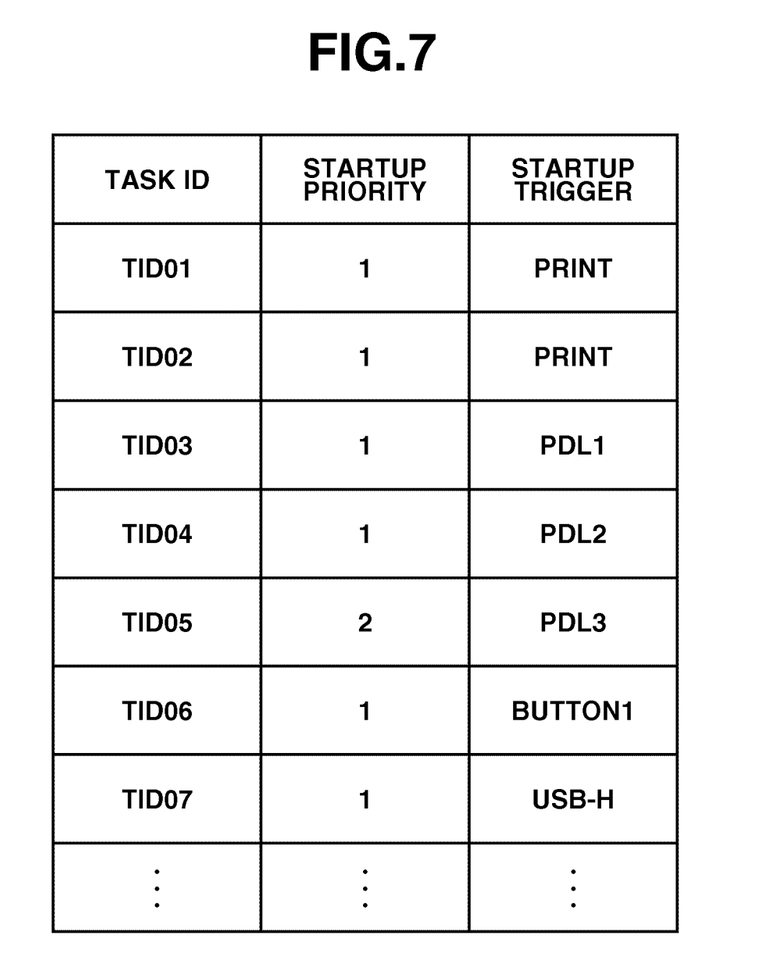
FIG. 7 is a task table used for the task startup control of the present invention.

Whether each of the multiple tasks is considered a priority task is determined in advance by the task table in FIG. 7. In the example illustrated in FIG. 7, the startup control unit 412 starts up TID01, TID02, TID03, TID04, TID06, and TID07 as priority tasks.

After starting the priority tasks, in step S104, the startup control unit 412 changes the device status from the "starting" status to the "job acceptable" status and displays the message on the panel unit 301 via the panel interface unit 401 to indicate that a print job is acceptable. In step S105, the startup control unit 412 determines if a job is accepted via the host interface unit 402. If a job is accepted (YES in step S105), in step S106, the startup control unit 412 determines if non-priority tasks must be started for the job. In step S107, if non-priority tasks must be started for the processing of the accepted job (YES in step S106), the startup control unit 412 starts up the non-priority tasks. Although the startup control unit 412 targets all non-priority tasks for startup, the target task may be limited to only the tasks required for the processing of the accepted job out of the non-priority tasks. If the job is not accepted (NO in step S105), flow proceeds to step S109 described below.

The job control unit 413 holds the processing of the accepted job until the startup control unit 412 completes the non-priority task startup processing in step S107. After the startup control unit 412 completes the non-priority task startup processing in step S107, the job control unit 413 restarts the processing for the job.

If it is determined that the non-priority tasks do not need to be started for the accepted job (NO in step 106), in step S108 the startup control unit 412 waits until all the processing for all accepted jobs is completed and the process proceeds to the processing of step S109. In step S109, the startup control unit 412 first determines if a button 1 is pressed that requires the startup of a non-priority task. For example, if it is detected that button 1 is pressed, the panel interface unit 401 displays a menu for providing the function composed of the processing of the non-priority task. In response to a user instruction entered by a menu operation via the panel interface unit 401, the non-priority task performs predetermined processing according to the contents of the menu.

If it is detected that button 1 is pressed that requires the startup of a non-priority task (YES in step S109), the startup control unit 412 starts the non-priority task in step S107. The panel interface unit 401 waits for the non-priority task startup processing in step S107 to be completed and displays a predetermined menu on the panel unit 301 via the panel interface unit 401. If it is not detected that button 1 (see previous comment) is pressed that requires the startup of a non-priority task (NO in step S109), in step S110 the startup control unit 412 determines if the removable medium 304 is inserted into the medium interface unit 411 that requires the startup of a non-priority task.

If the startup control unit 412 detects that the removable medium 304 is inserted into the medium interface unit 411 (YES in step S110), the panel interface unit 401 displays the menu for providing the function composed of the non-priority task processing and flow proceeds to step S107 to start the non-priority task. This menu can be similar to the menu displayed when button 1 is pressed. The corresponding non-priority task can be similar to the non-priority task provided when button 1 is pressed.

If in step S110 it is not detected that the removable medium 304 is inserted into the medium interface unit 411 that requires the startup of a non-priority task (NO in step S110), in step S111 the startup control unit 412 determines if a predetermined time TW has elapsed since the device entered the job acceptable status in step S104. Assuming that a job is accepted via the host interface unit 402 immediately after the device enters the job acceptable status, the time TW is a pre-set time for processing the accepted job before the non-priority task is started. The time TW may be changed via the menu provided for the user to change the setting.

If it is determined in step S111 that a time greater than or equal to the predetermined time TW has passed since the device entered the job acceptable status, the startup control unit 412 causes the process to proceed to step S107 to start the non-priority task. In step S111 if it is determined that the time that has passed since the device entered the job acceptance status (NO in step S111) is less than the predetermined time TW, the startup control unit 412 repeats the processing beginning in step S105.

Figure 4A:
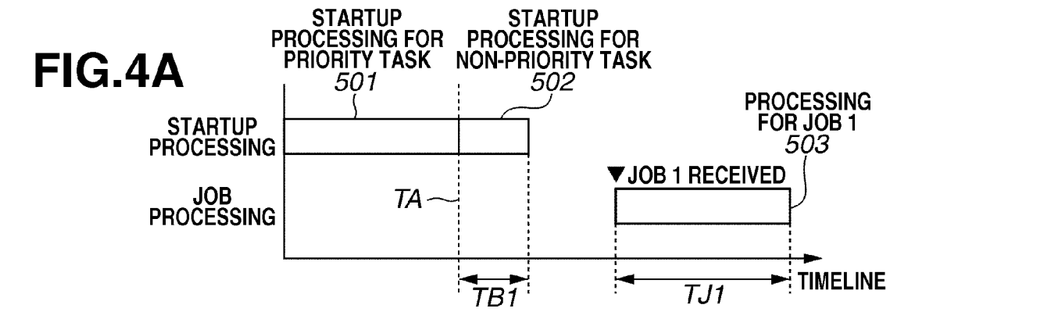
FIGS. 4A to 4D are time charts illustrating the steps for task startup control of the present invention.
Figure 4B:
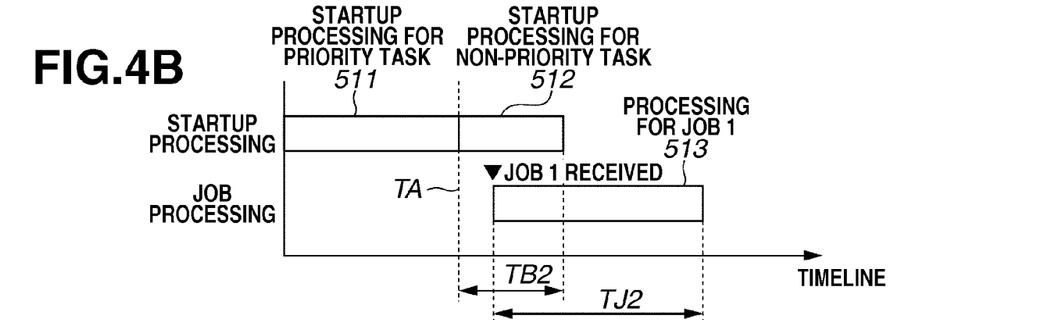

The following describes an example of control performed in steps S108 and S111 of FIG. 3. FIG. 4A and FIG. 4B are time charts for illustrating the startup processing and the job processing in the startup method in the conventional technology described before. In FIG. 4A, the startup control unit 412 executes startup processing 502 for a non-priority task immediately after startup processing 501 for a priority task is terminated. TA is the time at which the device enters the job acceptable status. The job control unit 413 executes processing 503 for a job 1 following receipt of the job 1. In FIG. 4B, the startup control unit 412 executes startup processing 512 for a non-priority task immediately after startup processing 511 for a priority task is terminated. Before the startup processing 512 for the non-priority task is terminated, the job control unit 413 executes processing 513 for job 1 when job 1 is received. Note that the processing time for job 1 is TJ1 in FIG. 4A and TJ2 (>TJ1) in FIG. 4B. The processing time for job 1 in the example in FIG. 4B is longer than that in the example in FIG. 4A. This is because the startup processing 512 for the non-priority task and the processing 513 for job 1 overlap in the example in FIG. 4B and therefore the ratio of the CPU time used for the processing 513 for job 1 is lower than that in the example in FIG. 4A.

Figure 4C:
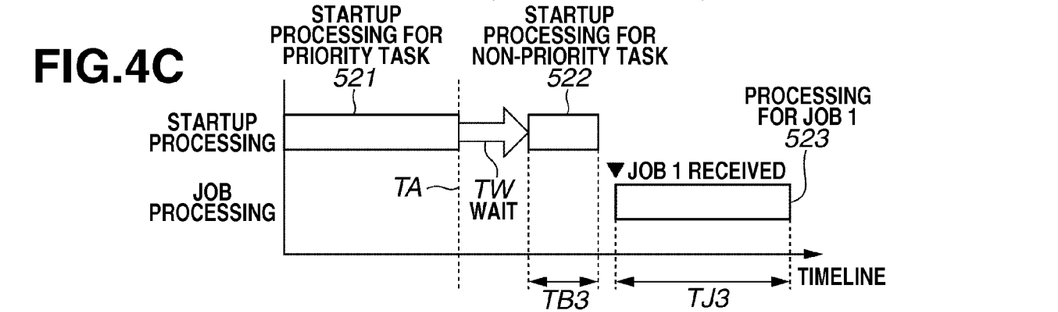
Figure 4D:
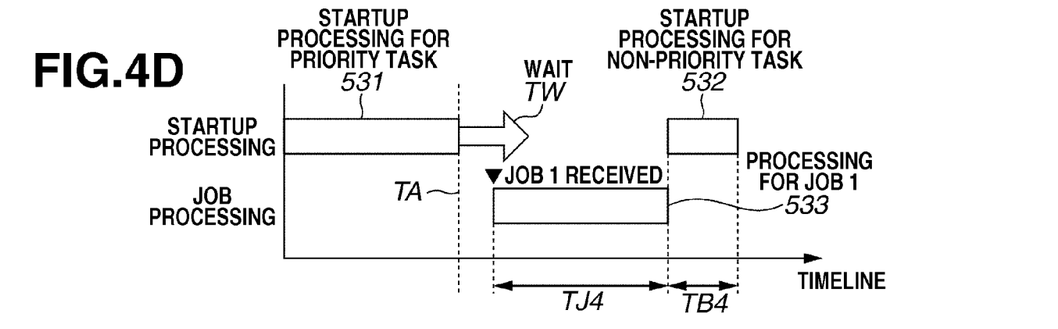

FIG. 4C and FIG. 4D are time charts for illustrating the startup processing and the job processing in steps S108 and S111 in FIG. 3. In FIG. 4C, the startup control unit 412 waits a predetermined time TW after startup processing 521 for a priority task is terminated to execute startup processing 522 for a non-priority task. The job control unit 413 executes processing 523 for job 1 following receipt of job 1.

In FIG. 4D, while the startup control unit 412 waits a predetermined time TW after startup processing 531 for a priority task is terminated, the job control unit 413 executes processing 533 for job 1 following receipt of job 1. The startup control unit 412 executes processing 532 for a non-priority task after confirming that a predetermined time TW has elapsed since the device enters the job acceptable status and that all processing of all jobs, including the startup processing 533 of job 1, is terminated. Note that, for the processing time for job 1, processing time TJ3 in FIG. 4C and processing time TJ4 in FIG. 4D are equal. The description given above indicates that the startup processing and the job processing in step S108 and S111 in FIG. 3 solve the problem that the processing time of job 1 becomes long as in the example in FIG. 4B.

Figure 5A:
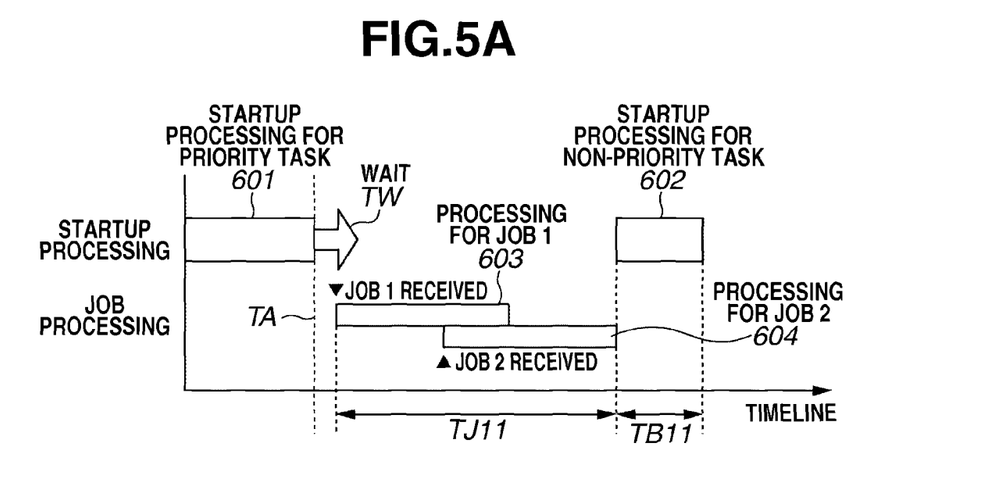
FIGS. 5A to 5B are time charts illustrating the steps for the task startup control of the present invention.
Figure 5B:
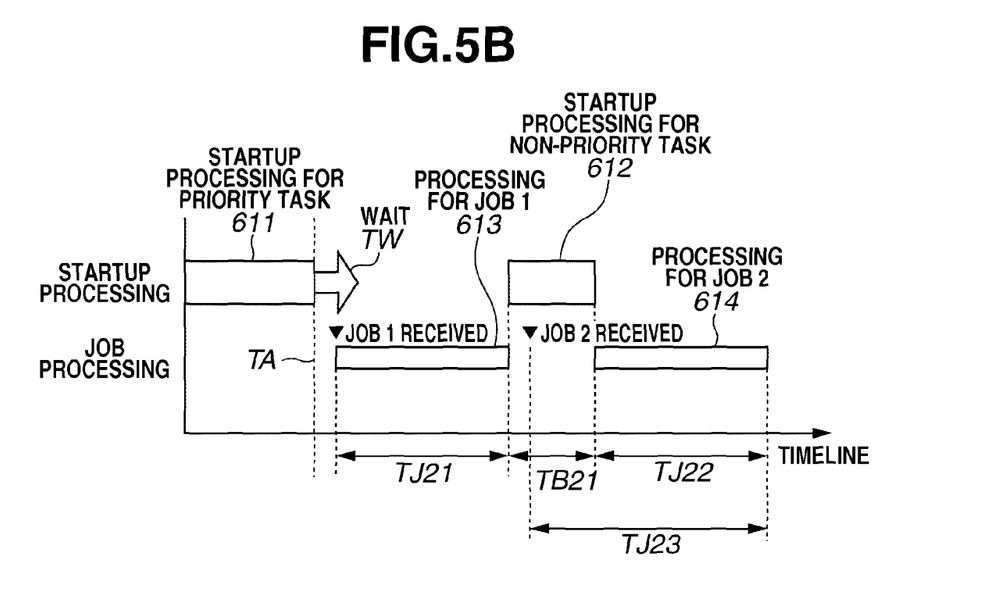

FIG. 5A and FIG. 5B are time charts for illustrating the startup processing and the job processing in steps S108 and S111 in FIG. 3 when multiple jobs are received. In FIG. 5A, while the startup control unit 412 waits a predetermined time TW after startup processing 601 for a priority task is terminated, the job control unit 413 executes processing 603 for a job 1 following receipt of the job 1. In addition, while executing the processing 603 for the job 1, job control unit 413 executes processing 604 for a job 2 following receipt of the job 2. The startup control unit 412 executes startup processing 602 for a non-priority task after confirming that a predetermined time TW is elapsed since the device enters the job acceptable status and that all processing of all jobs, including the processing 603 for the job 1 and the processing 604 for the job 2, is terminated.

In FIG. 5B, while the startup control unit 412 waits a predetermined time TW after startup processing 611 for a priority task is terminated, the job control unit 413 executes processing 613 for a job 1 following receipt of the job 1. The startup control unit 412 executes startup processing 612 for a non-priority task after confirming that a predetermined time TW is elapsed since the device enters the job acceptable status and that all processing of all jobs at that time, including the processing 613 for the job 1, is terminated. Even if the job 2 is received while the startup control unit 412 executes the startup processing 612 for the non-priority task, the job control unit 413 waits until the startup processing 612 for the non-priority task is terminated and then executes processing 614 for the job 2. The description provided above indicates that, even if multiple jobs are received after the controller 302 enters the job acceptable status, the startup processing and the job processing in steps S108 and S111 in FIG. 3 reduce the job processing time.

Figure 6:
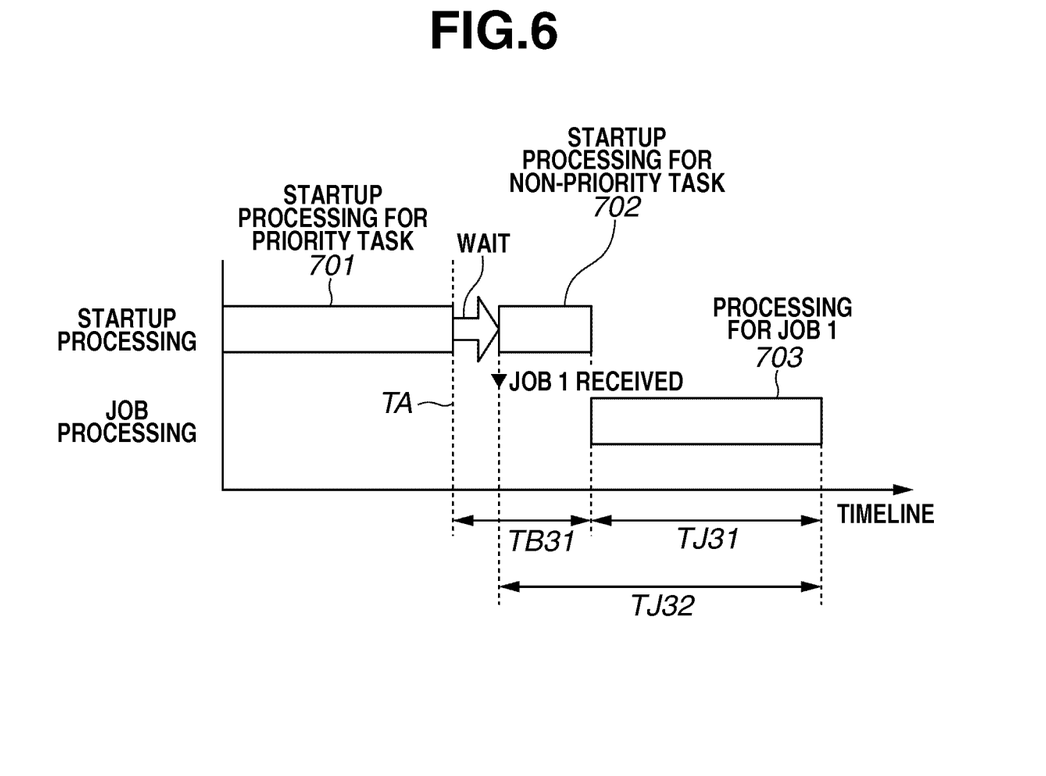
FIG. 6 is a time chart illustrating the steps for the task startup control of the present invention.

FIG. 6 is a time chart for illustrating the startup processing and the job processing in step S106 in FIG. 3. In FIG. 6, while waiting for a predetermined time TW after startup processing 701 for a priority task is terminated, the startup control unit 412 executes startup processing 702 for a non-priority task following receipt of a job 1. The startup control unit 412 executes the startup processing 702 for the non-priority task without waiting for the predetermined time TW so that the processing for the job 1 cannot be executed because the task required for the processing for the job 1 is allocated as a non-priority task.

For example, when the job 1 is a job composed of "PDL3" in FIG. 7, the startup control unit 412 executes the startup processing for task TID05 that is allocated as a non-priority task with the startup priority "2". The job control unit 413 executes startup processing 703 for job 1 after the startup control unit 412 terminates the startup processing 702 for the non-priority task. The description provided above indicates that, even if the startup of all tasks required for the job processing is not completed, the startup processing and the job processing in step S106 in FIG. 3 can start up the tasks required after the job is received and continue the job processing.

FIG. 7 illustrates a task table managed by the startup control unit 412. The startup control unit 412 uses the task table to manage the task ID, startup priority, and startup condition for each task. "Task ID" is the ID used to identify each one of the multiple tasks. "Startup priority" is an item that defines when to start the startup of a task. In the present embodiment, a task to be started up before the device enters the job acceptable status is defined as "1", and a task to be started up after the device enters the job acceptable status is defined as "2".

"Startup trigger" is an event that causes a task to be started if the task is not started. In present embodiment, the triggers are:
PRINT: Task required for print processing
PDL1: Task required for interpreting PDL1 job
PDL2: Task required for interpreting PDL2 job
PDL3: Task required for interpreting PDL3 job
BUTTON1: Task required when the panel interface unit 401 detects that button 1 on the panel unit 301 is pressed
USB-H: Task required when medium interface unit 411 detects that a removable medium is inserted into the USB host
For example, the startup control unit 412 checks that the task "TID05" is started when a PDL3 job is received. If the task TID05 is started, the startup control unit 412 performs no processing (job control unit 413 starts the interpretation processing for a print job); if TID05 is not started, the startup control unit 412 start the task.

Next, a second exemplary embodiment will be described. In the first exemplary embodiment, the startup control processing is performed according to the flowchart in FIG. 3 with the startup priority of each task predetermined as illustrated in FIG. 7. However, the startup priority of each task may vary according to the frequency of PDL job types used in the actual working environment.

Figure 8:
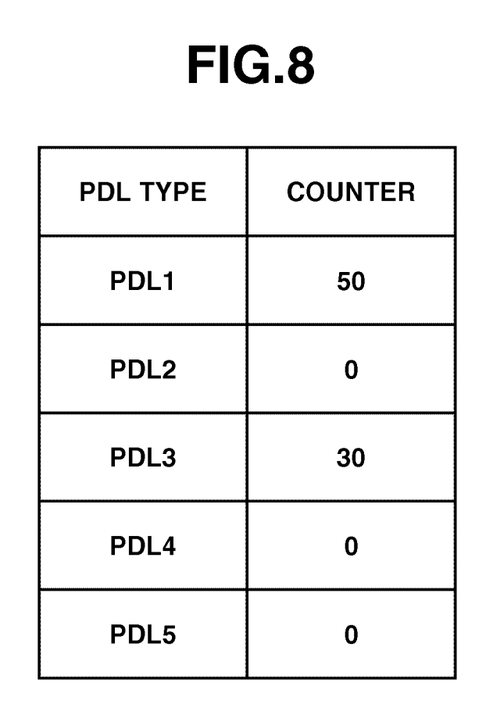
FIG. 8 is a PDL job type counter table used for the task startup control in a second exemplary embodiment of the present invention.

FIG. 8 is a diagram illustrating the PDL job type counter table used in the task startup control in the second exemplary embodiment of the present invention. In FIG. 8, the counter values of the PDL job type count table are counted up according to the PDL types of the jobs received by the job control unit 413. A shutdown control unit (not shown) changes the startup priorities in the task table illustrated in FIG. 7 according to the counter values of the PDL job type counter table.

For example, in the example of the task table in FIG. 7, the shutdown control unit changes the startup priorities of "TID03" to "TID05" in such a way that a high startup priority ("2") is set for "PDL1" and "PDL3" whose values are large in the PDL job type counter in FIG. 8 and a low startup priority ("1") is set for "PDL2". The next time the power is turned on, the startup control unit 412 performs the startup control in FIG. 3 according to the startup priorities on which the setting change described above are reflected. This allows the controller 302 to process a job, composed of "PDL1" and "PDL3" used more frequently in the environment, immediately after the controller 302 enters the job acceptable status.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-186071 filed Aug. 23, 2010, which is hereby incorporated by reference herein in its entirety.

What is claimed is:

1. An image forming device that starts a plurality of tasks for initializing processing of the image forming device at power-on time in stages, where the plurality of tasks include one or more priority or one or more non-priority tasks, the image forming device comprising:
a memory; and
a processor in communication with the memory, the processor configured to control:
a priority task startup detection unit configured to detect that a startup of one or more priority tasks have completed;
a job acceptance unit configured to change a status to a job acceptable status and accept a job when the priority task startup detection unit detects that the startup of the one or more priority tasks have completed, wherein the job acceptance unit accepts the job within or after a predetermined time elapses since the status changed to the job acceptable status and wherein the job is not involved with initializing of the image forming device;
a job type determination unit configured to determine a job type of the job accepted by the job acceptance unit;
a startup control unit configured to start up the one or more non-priority tasks immediately after the predetermined time elapses, and if the job is accepted by the job acceptance unit within the predetermined time after the startup of the priority task is completed, the startup control unit starts up the one or more non-priority tasks after processing for the job accepted by the job acceptance unit is completed and if the job acceptance unit accepts the job within the predetermined time and if a startup task determination unit determines that a non-priority task required to process the job of the job type determined by the job type determination unit has not started, the startup control unit starts the one or more non-priority tasks including the non-priority task required to process the job.

2. The image forming device according to claim 1, wherein, if the job acceptance unit accepts a job by the elapse of the predetermined time after the startup of the priority task is completed and if the startup task determination unit determines that a task required to process the job of the job type determined by the job type determination unit has not started, the startup control unit only starts the task required to process the job.

3. The image forming device according to claim 1, wherein the processor is further configured to control:
a button operation detection unit configured to detect a button operation;
a startup task determination unit configured to determine if a task required for processing corresponding to the button operation has started
wherein if the button operation detection unit detects the button operation from a time when the priority task startup detection unit detects that the startup of the priority task is completed to a time when the predetermined time elapses and if the startup task determination unit determines that the task required for the processing corresponding to the button operation has not started, the startup control unit starts non-priority tasks, including the task required for the processing corresponding to the button operation.

4. The image forming device according to claim 1, wherein the processor is further configured to control:
a button operation detection unit configured to detect a button operation; and
a startup task determination unit configured to determine if a task required for processing corresponding to the button operation, has started
wherein, if the button operation detection unit detects the button operation from a time when the priority task startup detection unit detects that the startup of the priority task is completed to a time when the predetermined time elapses and if the startup task determination unit determines that the task required for the processing corresponding to the button operation has not started, the startup control unit only starts the task required for the processing corresponding to the button operation.

5. The image forming device according to claim 1, wherein the processor is further configured to control:
a storage medium detection unit configured to detect that a storage medium is inserted into a storage medium interface;
a startup task determination unit configured to determine if a task required for processing corresponding to detecting insertion of the storage medium has started
wherein, if the storage medium detection unit detects that the storage medium is inserted from a time the priority task startup detection unit detects that the startup of the priority task is completed to when the predetermined time has elapsed and if the startup task determination unit determines that the task required for the processing corresponding to detecting insertion of the storage medium has not started, the startup control unit starts non-priority tasks, including the task required for the processing corresponding to detecting insertion of the storage medium.

6. The image forming device according to claim 1, wherein the processor is further configured to control:
a storage medium detection unit configured to detect that a storage medium is inserted into a storage medium interface;
a startup task determination unit configured to determine if a task required for processing corresponding to detecting insertion of the storage medium has started
wherein if the storage medium detection unit detects that the storage medium is inserted from a time when the priority task startup detection unit detects that the startup of the priority task is completed to a time when the predetermined time elapses and if the startup task determination unit determines that the task required for the processing corresponding to detecting insertion of the storage medium has not started, the startup control unit only starts the task required for the processing corresponding to detecting insertion of the storage medium.

7. The image forming device according to claim 1, wherein the processor is further configured to control:
a job type count holding unit configured to count a number of jobs by job type when a job is accepted by the job acceptance unit and to hold the count value; and
a task startup change unit configured to change a task startup control at a next power-on time according to count information created by the job type count holding unit.

8. A method performed by an image forming device that starts a plurality of tasks for initializing processing of the image forming device at power-on time in stages, where the plurality of tasks include one or more priority or one or more non-priority tasks, the method comprising:
detecting that a startup of one or more priority tasks have completed;
changing a status to a job acceptable status and accepting a job when the startup of the one or more priority tasks have completed, wherein the job is accepted within or after a predetermined time elapses since the status changed to the job acceptable status and wherein the job is not involved with initializing of the image forming device;
determining a job type of the job accepted;
starting up the one or more non-priority tasks immediately after the predetermined time elapses, and if the job is accepted within the predetermined time after the startup of the priority task is completed, starting up the one or more non-priority tasks after processing for the job accepted is completed and if the job is accepted within the predetermined time, determining that if a non-priority task required to process the job of the determined job type has not started, starting the one or more non-priority tasks including the non-priority task required to process the job.

9. A non-transitory computer-readable storage medium storing computer executable instructions that cause a computer to perform the a method that starts a plurality of tasks at for initializing processing of the image forming device power-on time in stages, where the plurality of tasks include one or more priority or one or more non-priority tasks, the method comprising:
detecting that a startup of one or more priority tasks have completed;
changing a status to a job acceptable status and accepting a job when the startup of the one or more priority tasks have completed, wherein the job is accepted within or after a predetermined time elapses since the status changed to the job acceptable status and wherein the job is not involved with initializing of the image forming device;
determining a job type of the job accepted;
starting up the one or more non-priority tasks immediately after the predetermined time elapses, and if the job is accepted within the predetermined time after the startup of the priority task is completed, starting up the one or more non-priority tasks after processing for the job accepted is completed and if the job is accepted within the predetermined time, determining that if a non-priority task required to process the job of the determined job type has not started, starting the one or more non-priority tasks including the non-priority task required to process the job.

* * * * *